June 24, 1958 R. H. LEONARD 2,840,605
METHOD OF MAKING LEVULINIC ACID
Filed April 26, 1957
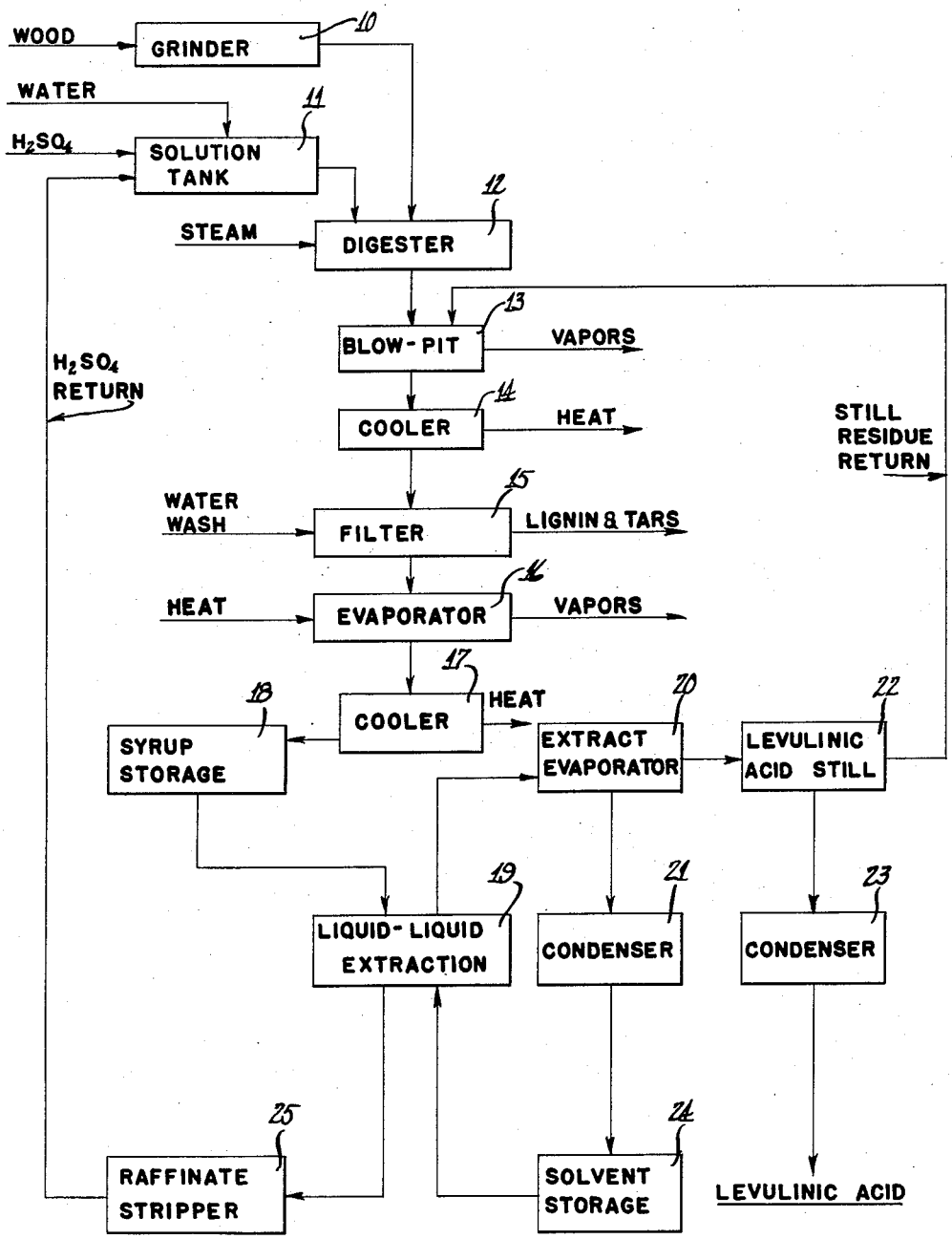
Reid H. Leonard

United States Patent Office 2,840,605
Patented June 24, 1958

2,840,605

METHOD OF MAKING LEVULINIC ACID

Reid H. Leonard, Pensacola, Fla., assignor to Heyden Newport Chemical Corporation, Pensacola, Fla., a corporation of Delaware Application April 26, 1957, Serial No. 658,912

6 Claims. (Cl. 260—528)

This invention relates to a method of making levulinic acid, and more particularly to a method of making levulinic acid from wood and other ligno-cellulosic material.

It has heretofore been proposed to make levulinic acid from wood cellulose by the hydroylzing action thereon of mineral acids, but to the best of my knowledge no completely satisfactory commercial method has been developed using wood, or, more particularly, spent solvent-extracted pine wood, as the starting material. Where the latter is used for saccharification, certain problems are introduced due to the residual resins, pitches and the like left in the wood after the extraction of rosin from the dead pine tree stumps, or "light wood" as it is called, by means of a hot organic solvent such as petroleum naphtha. While the naphtha removes most of the rosin, a considerable proportion of resins, pitches and tars up to around 10% by weight of the wood remain in the naphtha-extracted wood. These resins, pitches and tars are largely soluble in aromatic solvents, such as benzene, but, for the purposes of my method, it is not deemed feasible to remove the same before saccharification of the wood. Instead, the present method has been particularly devised to take into consideration the presence of such resins, pitches and tars, and to obviate the difficulties their presence in the wood would otherwise present.

It is, therefore, an important object of the present invention to provide an economic method of obtaining levulinic acid by the saccharification of ligno-cellulosic material.

It is a further important object of this invention to provide a method for making levulinic acid, in accordance with which spent solvent-extracted pine wood in comminuted form is subjected to hydrolysis in the presence of sulfuric acid, and the conditions of such hydrolysis and of the subsequent solvent extraction and other processing steps are so controlled as to give levulinic acid in good yield and on a reasonable cost basis.

It is a further important object of this invention to provide a method for making levulinic acid that obviates the use of steam in the distillation of levulinic acid under vacuum, since steam distillation under vacuum, as practiced in other processes for making levulinic acid, greatly complicates the problem of maintaining the required vacuum.

It is a further important object of my invention to provide a method of making levulinic acid from ligno-cellulose that avoids the use of excessively large amounts of acid solution in relation to the wood or other ligno-cellulosic material; that shortens the hydrolysis period; that makes novel use of the lignin residue from the hydrolysis step as an aid in obtaining a purer levulinic acid; and that by employing sulfuric acid as the acid catalyst avoids many of the corrosion problems that the more volatile acids heretofore used presented.

Other and further important objects of this invention will become apparent from the following description and appended claims.

The accompanying drawing is that of a flow sheet illustrating a preferred embodiment of my invention. Reference is made hereto in the following description.

The starting material for my method can be any available, low cost source of cellulose, or ligno-cellulose, but my method has been particularly devised for application to the spent, solvent-extracted pine wood referred to previously. Such spent wood is now used to some extent in the making of composition wall-board and the like, but much of it is merely burned for its fuel value and in order to dispose of it. Consequently, such spent wood constitutes a relatively cheap and plentiful source of ligno-cellulosic material for use in my method. It is already substantially dry (about 10% moisture content) and in comminuted form, and can be used as is, but can be made to give better yields of sugar, and hence of levulinic acid, if it is further ground in a grinder, such as indicated by the reference numeral 10, to a fineness corresponding to about 6 to 8 mesh (U. S. standard screen). Where the weight of the wood is referred to herein, such weight will be understood to be on an air-dry, or 10% moisture content, basis.

The acid that I prefer to use in effecting the saccharification of the wood is sulfuric acid. This is partly because of its relatively lower cost than other mineral acids such as hydrochloric or hydrobromic, but more largely because, by reason of its relative non-volatility, sulfuric acid lends itself better to my method. As will be pointed out in greater detail hereinafter, a part of the economy of my method is due to the fact that the sulfuric acid can be recovered rather simply for reuse.

The sulfuric acid solution is prepared for use in a solution tank 11. The concentration of sulfuric acid is of importance from the standpoint of over-all efficiency of the method. Such efficiency is dependent in part upon the time required by different steps in the method. I have found that if the concentration of the sulfuric acid is as low as 2% $H_2SO_4$ by weight, the hydrolysis requires more than 2 hours, whereas if the concentration of the aqueous sulfuric acid solution is maintained at between 3 and 5% by weight, there is no difficulty in maintaining the cooking, or hydroylsis, time within the arbitrarily set limit of about two hours. If the time required for effecting the maximum saccharification of the wood is unimportant, the concentration of the sulfuric acid can go as low as 2%. However, I prefer to use a concentration of sulfuric acid between about 3% and 12% by weight. The cooking time can be varied between about 1½ hours and 10 hours, or even longer, with the cooking temperature varying between about 140 and 180° C., and not over 210° C.

Another factor to be taken into consideration is the weight ratio of sulfuric acid solution to wood. It is desirable to keep the ratio as low as possible in order to avoid the handling of unnecessarily large volumes of liquid. This is especially important in the solvent extraction and solvent stripping stages later to be described. A weight ratio found to be satisfactory in operation is a 5 to 1 ratio, although ratios between 3 to 1 and 7.5 to 1 have been found satisfactory. If the ratio is higher than 10 to 1, such large volumes of liquid must be handled that the method becomes uneconomical, while with a ratio approaching 1 to 1, difficulties are encountered in getting proper liquid-solid contact for leaching purposes. These weight ratios are all on the basis of the dilute sulfuric acid solutions used and air-dry wood.

In the first step of my method the spent solvent-extracted wood, preferably after having been ground to 6 to 8 mesh, is charged into a digester 12 arranged for agitation and for steaming. The sulfuric acid solution preferably heated to, say, 80° C. from admixture with hot recovered acid, is then introduced into the digester and steam is then introduced to bring the entire charge in about 30 minutes up to a temperature within the range of 140° to 210° C. and preferably to a temperature of about 150° to 180° C. The wood is cooked within that temperature range for another 1½ to 9 hours.

The actual control of the cooking time is done by taking samples of the cook at frequent intervals toward the end of the 1½ hours period at 150° to 180° C. and analyzing for levulinic acid. For this purpose, the iodoform method of testing is employed. If the hydrolysis has proceeded sufficiently far to represent about a 15% weight conversion of the wood into levulinic acid, the cooking is stopped and the contents of the digester discharged into a blow-pit 13. There, since the blow-pit is operated at atmospheric pressure, a certain amount of steam is released, and the hydrolysate mass cools down to around 100° C.

From the blow-pit, the mass is transferred into a flash cooler 14 maintained under about 26 inches of vacuum and at a temperature such as to cool the mass to about 50° C. or lower. The purpose of this step is to cool the hydrolysate sufficiently to solidify or harden the resins, pitches or tars present in the hydrolysate to such an extent that they are largely filtered out in the following filtration step. As was pointed out earlier, these tarry substances are usually present when solvent-extracted resinous wood is used, probably due to the fact that residual resins, pitches and tars have been left in the wood after the rosin is extracted. If the hydrolysate is not cooled at this point to an extent sufficient to harden the tarry substances so that they can be filtered out on the woody or lignin material left from the cooking operation, considerable trouble is experienced later on in the solvent extraction and subsequent recovery of solvent. However, if the hydrolysate is cooled to about 50° C., and preferably lower, and then filtered, the tarry substances filter out quite nicely on the woody residues, lignin and like solids left from the digestion step. The woody residue thus serves as a filter aid. The lower the temperature to which the hydrolysate is cooled, the harder will the tarry substances become and the more complete their removal in the filtration step.

In the filtering step, carried out in a filter 15, the lignin and adhering tarry substances are filtered off and the filtrate is passed into an evaporator 16. There, the liquid hydrolysate, which at this point usually contains about 3% of levulinic acid by weight, is evaporated down to about one-third of its original volume to produce what may be termed a syrup. The purpose of concentrating the filtrate is one primarily of economy, but is also to facilitate the extraction of the filtrate with a solvent under countercurrent conditions. The evaporation can be carried out at atmospheric pressure and to the desired concentration of levulinic acid in the syrup. A concentration of around 10%, with a minimum concentration of 8%, has been found satisfactory.

From the evaporator, the syrup is passed through a cooler 17 into storage 18, or after cooling to about 50° C., directly into a liquid-liquid extraction column 19. A relatively tall, small diameter column is preferred. The syrup is introduced at or near the top and the solvent at or near the bottom of the column. The extract is drawn off at the top and the raffinate at the bottom. The column is operated at any suitable temperature for the particular solvent used. In general, a temperature of about 50° C. was found satisfactory, using methyl iso-butyl ketone as the solvent.

The selection of the solvent is very important. I have tested benzene, cymene, certain alcohols, esters, ethers, ketones and halogenated hydrocarbons for their suitability as solvent in my method, and have found the ketones best adapted for my purposes. The solvent should preferably be one that is inert toward acids, such as the sulfuric acid solution used as acid catalyst; that is relatively immiscible with water; and that can be readily stripped as an azeotrope from the raffinate. The alcohols and esters do not answer these requirements so well as the ketones. In particular, the alcohols extract too much material foreign to levulinic acid. The halogenated hydrocarbons can be used, but the more volatile ones such as methylene chloride present problems of using pressure vessels and of excessive solvent losses.

The water insoluble ketones that have been found suitable for use as solvent in my method are the following:

Di-ethyl ketone
Methyl iso-butyl ketone
Methyl butyl ketone
Ethyl propyl ketone
Methyl amyl ketone
Methyl propyl ketone
Cyclohexanone It will be noted that these ketones are all 5- to 7-carbon atom compounds. The higher molecular weight ketones, such as di-iso-butyl ketone, are not so satisfactory. The lower molecular weight ketones are not suited either, due to their greater miscibility with water. The ketones listed above have a solubility in water of not over about 2%. For instance, in the case of methyl iso-butyl ketone, its solubility in water at 25° C. is 1.7%, while the solubility of water in the ketone is 1.9%. Methyl iso-butyl ketone has an azeotrope with water:

B. P. at 760 mm. is 87.93° C.
Wt. percent of ketone is 75.7%

None of ketones in the above list has any chemical reactivity under the conditions obtaining in my process toward the dilute sulfuric acid used in my method or toward the levulinic acid to be recovered. If the hydrolysate were first neutralized, other solvents than the ketones could doubtless be used, but I prefer not to neutralize the hydrolysate.

The volume rate flow of solvent through the extraction column should be carefully controlled to insure optimum extraction conditions. About 85%, or better, removal of the levulinic acid in the extraction column should be obtained. Some of the levulinic acid will be carried out of the column in the raffinate but that goes back into the system with the sulfuric acid that is recovered from the raffinate. The raffinate is first steamed in a stripper 25 to remove traces of solvent and then the dilute sulfuric acid is returned to the acid solution tank 11 as make-up.

From the extraction column, the solvent goes to a solvent evaporator 20 operated at about 110 to 115° C. Solvent vapors from the evaporator are condensed in a condenser 21 and the condensate sent to solvent storage 24.

Crude levulinic left behind in the solvent evaporator is passed into a levulinic acid still 22. If solvent is present in the crude levulinic acid, the solvent is removed during heating until a pot temperature of about 160° C. is reached. Thereupon the mass in the still is steamed until practically no oil is found in the distillate. The nature and origin of the oil are not well understood, but it is apparently derived from the wood, and should be removed. A vacuum is then pulled gradually on the still until the residual water and solvent have been stripped out. Thereafter the still is operated under 5 to 10 mm. Hg absolute pressure until a pot temperature of about 180° C. is reached at that pressure. The temperature should not be carried much higher than 180° C. and certainly not so high as 200° C. or a considerable reduction in yield of levulinic acid will ensue.

At this point in the operation of the still, the residue in the still, although thick and tarry, is still fluid enough to handle and it is piped, while still hot, back into the system at the blow-pit 13, or just ahead of the flash cooler. There it mixes with the hydrolysate from another cook. The still residue, although relatively small in quantity, contains about 50% of levulinic acid by weight. Much of this is recovered by provision for the return of the still residue to the system for admixture with a subsequent batch of hydrolysate ahead of the filtering step. There, the tars coming from the still residue are filtered out on the lignin along with tarry substances already in the hydrolysate.

The levulinic acid vapors coming over from the still with the steam and solvent are condensed in a condenser 23 and recovered as a yellow to red-brown liquid analyzing 90%, or better, levulinic acid.

The recovery that may be expected, using my process is about 81% of the levulinic acid in the filtrate.

While the source material for which the method of my invention has been particularly designed is a spent, solvent-extracted pine wood, it will be understood that other cellulose or ligno-cellulose-containing material and particularly soft woods, can be processed to advantage by the method herein described.

The following table gives the various conditions of treatment and the yields of levulinic acid based upon the air-dry weight of pine wood used as the source material, for 27 cooks:

Table

| Cook No. | Acid Conc., Percent H₂SO₄ | Type | Cooking Temp., °C. | Cooking Time, Minutes | Liquid Wood | Agitation, R. P. M. | Percent Yield |
|---|---|---|---|---|---|---|---|
| 1 | 3.2 | R | 175 | 110 | 5/1 | 190 | 14.1 |
| 2 | 4.3 | R | 175 | 110 | 5/1 | 190 | 15.8 |
| 3 | 5.4 | R | 175 | 120 | 5/1 | 190 | 14.9 |
| 4 | 7.3 | R | 170 | 120 | 5/1 | 190 | 15.8 |
| 5* | 8.0 | R | 175 | 140 | 5/1 | 190 | 13.0 |
| 6 | 4.1 | R | 175 | 120 | 5/1 | 100 | 12.5 |
| 7 | 5.1 | R | 175 | 100 | 5/1 | 100 | 12.0 |
| 8 | 6.1 | F | 170 | 240 | 5/1 | 100 | 16.8 |
| 9 | 7.4 | R | 175 | 100 | 5/1 | 100 | 13.1 |
| 10 | 8.1 | F | 170 | 240 | 5/1 | 100 | 17.4 |
| 11 | 10.1 | F | 170 | 240 | 5/1 | 100 | 16.4 |
| 12 | 12.2 | F | 170 | 240 | 5/1 | 100 | 14.3 |
| 13 | 4.1 | R | 175 | 105 | 3/1 | 100 | 14.3 |
| 14 | 4.6 | R | 175 | 105 | 3/1 | 100 | 16.0 |
| 15 | 6.9 | R | 160 | 120 | 6/1 | 190 | 14.5 |
| 16 | 7.3 | R | 170 | 120 | 6/1 | 190 | 18.3 |
| 17 | 8.1 | R | 165 | 120 | 6/1 | 190 | 18.0 |
| 18 | 9.1 | R | 175 | 140 | 6/1 | 190 | 17.0 |
| 19 | 9.5 | R | 175 | 140 | 6/1 | 190 | 14.7 |
| 20 | 3.1 | R | 175 | 140 | 7.5/1 | 190 | 18.1 |
| 21 | 3.6 | R | 175 | 135 | 7.5/1 | 190 | 17.3 |
| 22 | 8.1 | F | 150 | 540 | 5/1 | 100 | 14.7 |
| 23 | 8.1 | F | 150 | 480 | 5/1 | 100 | 15.8 |
| 24 | 5.5 | R | 160 | 540 | 5/1 | 100 | 18.9 |
| 25 | 8.1 | F | 160 | 480 | 5/1 | 100 | 15.7 |
| 26 | 8.1 | F | 160 | 240 | 5/1 | 100 | 19.2 |
| 27 | 8.1 | F | 170 | 240 | 5/1 | 100 | 17.1 |

*Raw wood.
R = Recycled acid.
F = Fresh acid.

This application is a continuation-in-part of my co-pending application Serial No. 355,026, filed May 14, 1953, now abandoned.

I claim as my invention:

1. The method of making levulinic acid from ligno-cellulosic material, which comprises subjecting said material in comminuted form to the hydrolyzing action of a dilute sulfuric acid solution, the sulfuric acid solution containing from about 3 to 12% by weight of $H_2SO_4$ and being in the weight proportion to wood of between 10 to 1 and 1 to 1, heating the mass of ligno-cellulose material and sulfuric acid solution to a temperature of from about 140° to 210° C., holding the mass within that temperature range until at least about 15% by weight of the ligno-cellulose material on an air-dry basis has been converted into levulinic acid, cooling the hydrolysate mass including residual lignin substances to a temperature of at least about 50° C. at which hardening of tars present therein takes place, removing such tars by filtration through such residual lignin substances as a filter aid, extracting the resulting cooled substantially tar-free hydrolysate with a ketone immiscible with water, and recovering levulinic acid from the resulting extract.

2. The method of making levulinic acid from woody material, which comprises subjecting said material in comminuted form to the hydrolyzing action of a dilute sulfuric acid solution, the sulfuric acid solution containing from about 3 to 12% by weight of $H_2SO_4$ and being in the weight proportion to woody material of between 10 to 1 and 1 to 1, heating the mass of woody material and sulfuric acid solution with agitation to a temperature of from 150 to 180° C., holding the mass within that temperature range until at least about 15% by weight of the wood on an air-dry basis has been converted into levulinic acid, cooling the hydrolysate mass including residual woody substances to a temperature of at least about 50° C. at which hardening of tars present therein takes place, removing said tars by filtration through said residual woody substances as a filter aid, extracting the resulting cooled hydrolysate with methyl iso-butyl ketone immiscible with water, steam distilling the resulting extract to strip off solvent and leave as residue a crude levulinic acid, vacuum distilling said crude levulinic acid in the absence of steam to distill off levulinic acid and leave as residue a mixture of levulinic acid and tars, returning said acid-tars mixture for admixture with a portion of the hydrolysate mass to be cooled therewith, filtered through residual woody substances and reprocessed, and collecting levulinic acid as distillate from the distilling of the crude levulinic acid.

3. The method of making levulinic acid from ligno-cellulose which comprises subjecting said ligno-cellulose in comminuted form and while being agitated to the hydrolyzing action of a dilute aqueous sulfuric acid solution of between about 3 and 12% $H_2SO_4$ by weight, the solution as a whole being in the weight proportion to the ligno-cellulose undergoing hydrolysis of from about 3 to 1 to 7.5 to 1, heating the resulting mass of ligno-cellulose and acid solution to a temperature of about 150 to 180° C., holding the mass substantially within that temperature range until at least about 15% by weight of the ligno-cellulose (air-dry basis) has been converted into levulinic acid, promptly thereafter cooling said mass including residual ligno-cellulose to a temperature of at least about 50° C. and sufficiently low to effect an appreciable hardening of tars present in the mass, filtering the cooled mass through residual ligno-cellulose as a filter aid to filter out lignin and tars, evaporating the resulting filtrate to a substantially lesser volume of syrup, cooling said syrup, countercurrently extracting said syrup with a water-immiscible ketone as solvent, steam distilling the resulting extract to strip off solvent and leave as residue a crude levulinic acid, vacuum distilling said crude levulinic acid in the substantial absence of steam to distill off levulinic acid and leave as residue a mixture of levulinic acid and tars, returning said acid-tars mixture to a similar process for admixture with a hydrolysate mass therein for reprocessing through the balance of the processing steps, and recovering the distilled levulinic acid.

4. The method of making levulinic acid from woody material which comprises subjecting said woody material in comminuted form and while being agitated to the hydrolyzing action of a dilute aqueous sulfuric acid solution of between about 3 to 12% $H_2SO_4$ by weight, the solution as a whole being in the weight proportion to the woody material undergoing hydrolysis of from about 3 to 1 to 7.5 to 1, heating the resulting mass of woody material and acid solution to a temperature of about 150 to 180° C., holding the mass substantially within that temperature range until at least about 15% by weight of the woody material (air-dry basis) has been converted into levulinic acid, promptly thereafter cooling said mass to a temperature in the neighborhood of 50° C. and lower to effect an appreciable hardening of tars present in the mass, filtering the cooled mass to filter out lignin and tars using the residual woody material as a filter aid, evaporating the resulting tar-free filtrate to a substantially lesser volume of syrup, cooling said syrup, countercurrently extracting said syrup with methyl iso-butyl ketone as solvent, steam distilling the resulting extract to strip off solvent and leave as residue a crude levulinic acid, vacuum distilling said crude levulinic acid in the substantial absence of steam to distill off levulinic acid and leave as residue a mixture of levulinic acid and tars, returning said acid-tars mixture to a similar process for admixture with a hydrolysate mass therein for reprocessing through the balance of the processing steps, and recovering the distilled levulinic acid.

5. The method of making levulinic acid from spent pine wood from which rosin has been extracted, which comprises subjecting said wood in comminuated form to the hydrolyzing action of an aqueous sulfuric acid solution of from about 3 to 12% by weight $H_2SO_4$ and in the weight proportion of from about 3 to 1 to 7.5 to 1 sulfuric acid solution to wood, heating the mass of wood and sulfuric acid solution to a temperature of between 140 and 210° C., holding the mass within that temperature range until at least about 15% by weight of wood on an air-dry basis has been converted into levulinic acid, cooling the resulting hydrolysate to a temperature of at least about 50° C. at which hardening of tars present therein takes place, filtering said hydrolysate using the lignins present in the hydrolysate as a filter aid to filter out said hardened tars, extracting the resulting filtrate in a liquid-liquid extraction with a ketone substantially insoluble in water, recovering levulinic acid from the resulting extract and recovering sulfuric acid from said extract and reusing the same in said method.

6. The method of making levulinic acid from spent pine wood from which rosin has been extracted, which comprises subjecting said wood in comminuted form to the hydrolyzing action of an aqueous sulfuric acid solution of from about 3 to 12% by weight $H_2SO_4$ and in the weight proportion of from about 3 to 1 to 7.5 to 1 sulfuric acid solution to wood, heating the mass of wood and sulfuric acid solution to a temperature of between 140 and 210° C., holding the mass within that temperature range until substantial saccharification and conversion into levulinic acid has occurred, cooling the resulting hydrolysate to a temperature of at least about 50° C. at which hardening of tars present therein takes place, filtering said hydrolysate using the lignins present in the hydrolysate as a filter aid to filter out said hardened tars, extracting and resulting filtrate in a liquid-liquid extraction with a ketone substantially insoluble in water, recovering levulinic acid from the resulting extract and recovering sulfuric acid from said extract and reusing the same in said method.

References Cited in the file of this patent

UNITED STATES PATENTS

| | | |
|---|---|---|
| 2,305,738 | Scheuing et al. | Dec. 22, 1942 |
| 2,394,334 | Scholler | Feb. 5, 1946 |
| 2,684,981 | Sherman | July 27, 1954 |

FOREIGN PATENTS

| | | |
|---|---|---|
| 732,896 | Germany | Mar. 19, 1943 |